Aug. 26, 1969  A. C. LINDSTROM  3,463,340

SCREW CAP WITH LOCKING MEANS

Filed Sept. 18, 1967

INVENTOR.
Alrik Ciner Lindstrom
BY
Cushman, Darby & Cushman
Attorneys

# United States Patent Office 3,463,340
Patented Aug. 26, 1969

3,463,340
SCREW CAP WITH LOCKING MEANS
Alrik Civer Lindstrom, Harpsundsvagen 164,
Bandhagen, Sweden
Filed Sept. 18, 1967, Ser. No. 668,417
Claims priority, application Sweden, Sept. 28, 1966,
13,083/66
Int. Cl. B65d 53/02
U.S. Cl. 215—40                                5 Claims

ABSTRACT OF THE DISCLOSURE

A screw cap provided with one or more sealing flanges which project from the top of the cap for cooperation with the end of the mouth wall of a bottle or the like, according to the invention is provided with an additional flange, or has one of its sealing flanges extending in close proximity to the wall of the cap, whereby an elastic attachment or locking of the screwed cap is effected due to elastic engagement of said sealing flange or said additional flange with the outside of the mouth wall of the bottle and with the wall of the cap. Tests have proved that in case of equal tightening moments the moment required for unscrewing a screw cap according to the invention from a bottle is about 75% greater than the corresponding moment required for a conventional screw cap having sealing flanges only.

---

This invention relates to a screw cap of the type comprising one or more sealing flanges projecting from the top of the cap for cooperation with the end of the mouth wall of a bottle or the like.

Screw caps of this type have an effective sealing capability after they have been screwed onto a bottle and also during some time afterwards. However, after bottles provided with screw caps have been stored for some time the cap has a tendency to become less tight, probably because of cold flow of the material of the cap which usually consists of a thermoplastic material, resulting in that the bottle will not be tightly closed.

It has been found that the cap can be considerably better secured to the bottle if in accordance with this invention a sealing flange or an additional flange extends in close proximity to the wall of the cap, whereby to effect an elastic attachment of the screwed cap due to engagement of the flange with the outside of the mouth wall of the bottle or the like and with the wall of the cap. Tests have proved that in case of equal tightening moments the moment required for unscrewing a screw cap according to the invention from a bottle is about 75% greater than the corresponding moment required for unfastening a conventional screw cap having sealing flanges only.

Figure 1:
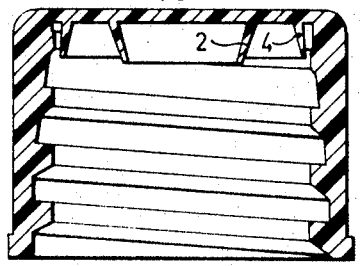
Figure 2A:
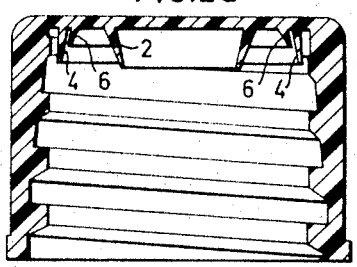
Figure 2B:
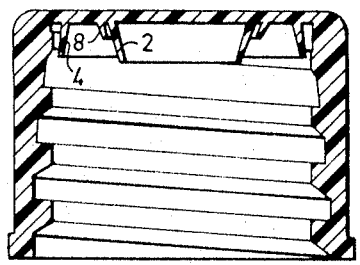

The invention is now described more closely with reference to the annexed drawing in which FIG. 1 is a sectional view of a screw cap provided with a lock flange and FIGS. 2a and 2b are sectional views of screw caps according to the invention having different conceivable configurations of sealing flanges.

By way of example, the screw cap illustrated in FIG. 1 is made by injection moulding a thermoplastic material. The top of the cap is formed with a thin sealing flange 2 which is concentric with the cap. The purpose of this sealing flange is to effect a tight closure of a bottle or the like, not shown, by engaging the inner edge of the mouth wall of the bottle. As mentioned above, the sealing effect is satisfactory as long as the screw cap remains reliably screwed onto the bottle. However, if the screw cap becomes less tight after the bottle has been stored for some time the sealing will no longer be effective. In order to prevent the screw cap from getting loose, there is provided a lock flange 4 in close proximity to the wall of the cap as shown in FIG. 1. The lock flange need not necessarily serve as a sealing member. When the cap is being screwed onto the bottle, not shown, the outside of the mouth wall of the bottle will elastically force the flange 4 toward the wall of the cap and slightly upwardly, with the result that after the cap has been completely screwed onto the bottle an elastic locking action will be obtained between the cap and the bottle.

FIGS. 2a and 2b illustrate examples of an additional sealing flange 6 and 8, respectively, which may be provided in a screw cap according to the invention for obtaining a larger sealing area in a manner known per se.

Many different embodiments of the screw cap according to the invention are conceivable to meet various requirements such as to the selection of the material of the screw cap. The lock flange need not necessarily extend along a closed line. It may be replaced by a plurality of shorter flanges located on a common circular line close to the inner wall of the cap. These shorter flanges need not necessarily have the same radius of curvature as said circular line.

In the production of bottles which are to be provided with a lock flange according to the invention the moulds used therefor can in a suitable way be so worked that the almost inevitably unsymmetrical and uneven shape of the outside of the mouth wall is further emphasized, by means of which the effect of the lock flange is further supported.

What I claim is:

1. A screw cap for bottles or the like comprising a top and a continuous side wall threaded to cooperate with threads on the exterior of the neck of a bottle or the like, at least one sealing flange projecting downwardly from said top and adapted to engage with an edge of said neck forming the opening into said bottle or the like to effect a seal therewith when said cap is fully threaded onto said bottle, and a lock flange projecting downwardly from said top and positioned thereon so that said lock flange extends between said side wall and the neck of a bottle being mated with said screw cap and so that said lock flange is wedged therebetween exerting a radial force on said bottle neck when said screw cap is fully threaded on said neck.

2. The screw cap defined in claim 1 wherein said lock flange is circular in shape and extends around said top through an angle of at least 180°.

3. The screw cap defined in claim 1 wherein said lock flange forms an annular ring.

4. The screw cap defined in claim 1 wherein said lock flange is constituted by a plurality of individual flanges extending around said top on a common curved line.

5. The screw cap defined in claim 4 wherein said individual flanges have radii of curvature of lengths different from the distances between said flanges and the center of said cap.

References Cited

UNITED STATES PATENTS 3,360,149   12/1967   Roth _____ 215—40

FOREIGN PATENTS 202,476   5/1959   Austria.

GEORGE T. HALL, Primary Examiner

U.S. Cl. X.R.
215—43